United States Patent [19]
Wood

[11] Patent Number: 5,193,322
[45] Date of Patent: Mar. 16, 1993

[54] MOLDING ASSEMBLY

[75] Inventor: James Wood, Williamsport, Pa.

[73] Assignee: D/P, Inc., Williamsport, Pa.

[21] Appl. No.: 655,050

[22] Filed: Feb. 14, 1991

[51] Int. Cl.$^5$ .............................................. E04F 19/02
[52] U.S. Cl. ................................. 52/718.01; 52/287;
52/312; 52/775; 52/717.01
[58] Field of Search ................. 52/312, 313, 287, 716,
52/717, 775, 776, 779

[56] References Cited

U.S. PATENT DOCUMENTS

| | | |
|---|---|---|
| 240,916 | 5/1881 | Maxwell . |
| 303,356 | 8/1884 | Beck . |
| 314,833 | 3/1885 | Harsha . |
| 351,116 | 10/1886 | Mankey . |
| 368,245 | 8/1887 | Schumacher . |
| 1,988,236 | 1/1935 | Chatfield . |
| 2,116,846 | 5/1938 | Pilcher . |
| 3,090,085 | 5/1963 | Brown ................................... 52/775 |
| 3,136,395 | 6/1964 | Rebele ................................... 52/775 |
| 3,196,992 | 7/1965 | Owen ..................................... 52/775 |
| 3,606,717 | 9/1971 | Moore .................................... 52/775 |
| 3,803,781 | 4/1974 | Struben . |
| 3,956,861 | 5/1976 | Rasmussen . |
| 4,052,830 | 10/1977 | Smith . |
| 4,706,431 | 11/1987 | Corvese . |
| 4,943,335 | 7/1990 | Schroder et al. ...................... 52/716 |

FOREIGN PATENT DOCUMENTS 662500 5/1963 Canada .................................. 52/766

Primary Examiner—Michael Safavi
Attorney, Agent, or Firm—Thomas Hooker

[57] ABSTRACT

A molding assembly including an elongate base molding, a trim recess extending along the length of the base molding, a trim molding fitted within the recess and retention inserts in the base molding holding the trim molding in place.

27 Claims, 2 Drawing Sheets

MOLDING ASSEMBLY

FIELD OF THE INVENTION

The invention relates to decorative moldings of the type used to frame doorways, windows and other recesses; and to form crown moldings, baseboards, chair rails and the like.

DESCRIPTION OF THE PRIOR ART

Molding is conventionally made from one-piece stock, which may be made of wood, plastic or metal, with a shape machined or formed into the exposed side of the molding. Once the molding has been made to a given shape it is not possible to change the shape of the molding. After conventional molding has been attached to a supporting surface, the decorative design of the molding is fixed and cannot be changed without removal of the molding. A molding change requires removal of the original molding, cutting and fitting of new molding and attachment of the new molding onto the support surface. This is an expensive and time consuming operation.

SUMMARY OF THE INVENTION

The invention relates to a molding assembly including a base molding which is permanently fitted and attached onto a support surface and a trim molding which is removably mounted in a trim recess in the base molding. The trim molding is easily removable from the base molding to permit change in the appearance of the molding without the necessity of removing the entire molding from the support surface. The trim molding is secured in a trim recess formed in the base molding by opposed resilient inserts that extend into the recess and resiliently engage and hold the sides of the trim molding. These inserts permit ready removal of the trim molding as desired and replacement with other trim molding having a different decorative shape.

The base molding is attached to the support surface by nails or screws driven through the bottom of the trim recess in the base molding before the trim molding is inserted into the recess. In this way, the trim molding conceals the nail and screw holes and assures a very neat appearance without the need to putty or finish exposed attachment holes in the molding. This is particularly advantageous when the molding assembly is stained because of the difficulty in staining filling used to conceal holes to match the surrounding wood.

The inserts used to hold the trim molding in the trim recess are seated within insert grooves extending into the sidewalls of the recess. The inserts are accurately located in proper position for engaging the trim molding despite possible collection of cuttings and debris in the relatively inaccessible bottoms of the recesses. The inserts include outwardly bowed contact arms with spring ribs that engage the sides the inserted trim molding and are deformed inwardly to provide high friction resilient connections firmly holding the trim molding in place while permitting ready removal of the trim molding when required.

Other objects and features of the invention will become apparent as the description proceeds, especially when taken in conjunction with the accompanying drawings illustrating the invention, of there are two sheets and one embodiment.

DESCRIPTION OF THE PREFERRED EMBODIMENT

Figure 1:
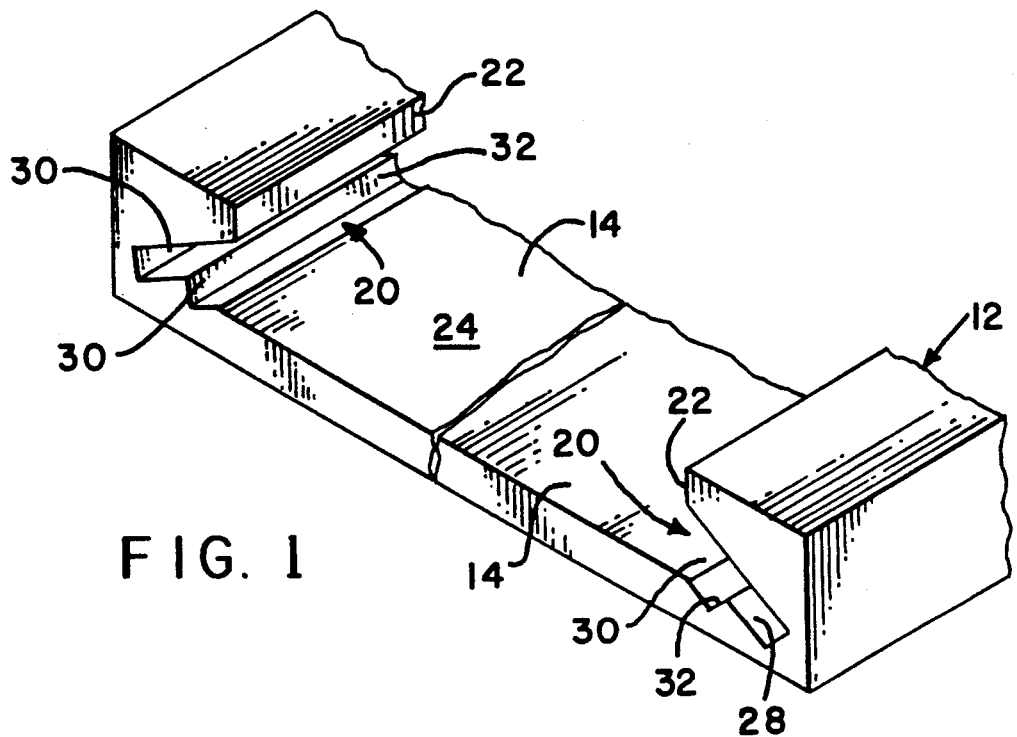
FIG. 1 is a perspective view of a base molding showing a recess for reception of a trim molding.

Molding assembly 10 includes an elongate uniform cross section base molding 12 having a central trim recess 14 formed on one side thereof and extending the length of the molding. An elongate trim molding 16 is fitted in recess 14 and is removably held within the recess by a plurality of trim molding retention inserts 18 fitted in angled grooves 20 formed in the sides 22 of recess 14. The base and trim moldings may be made of wood or other suitable materials such as a plastic, metal and the like. The exterior surfaces of the moldings are shaped to desired molding designs, not illustrated in the drawings. Inserts 18 are preferably formed from a resilient plastic material.

Figure 2:
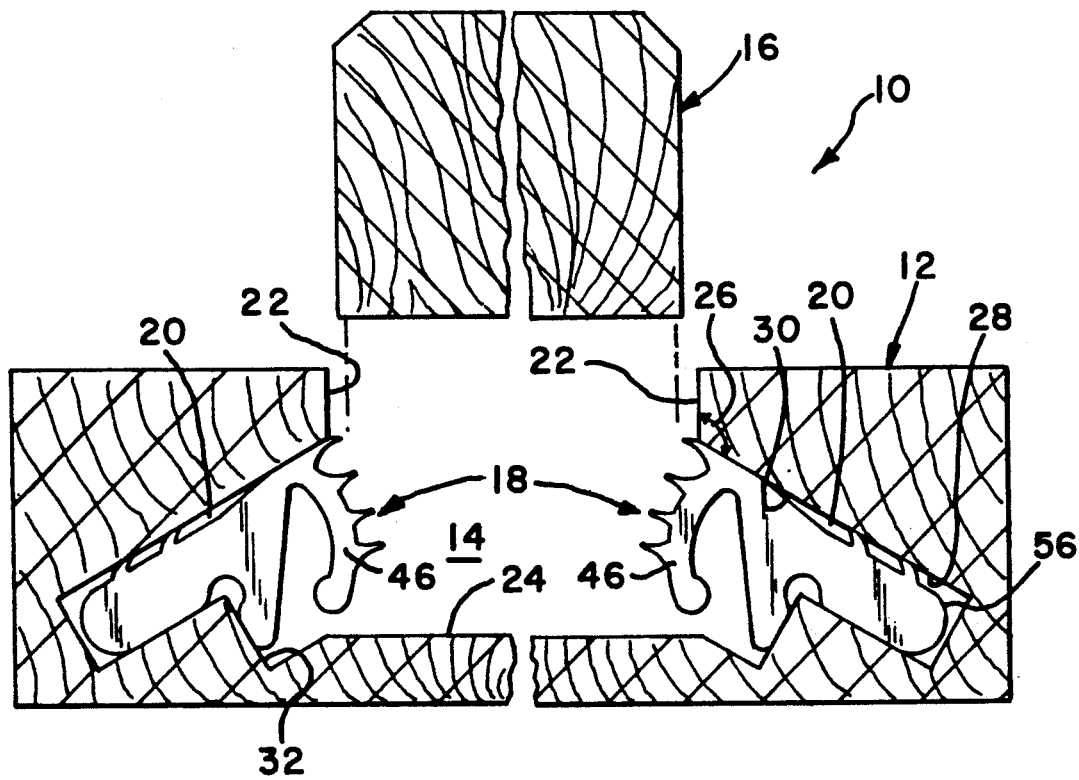
FIG. 2 is a sectional view showing the base molding, trim molding and retention inserts prior to insertion of the trim molding.
Figure 3:
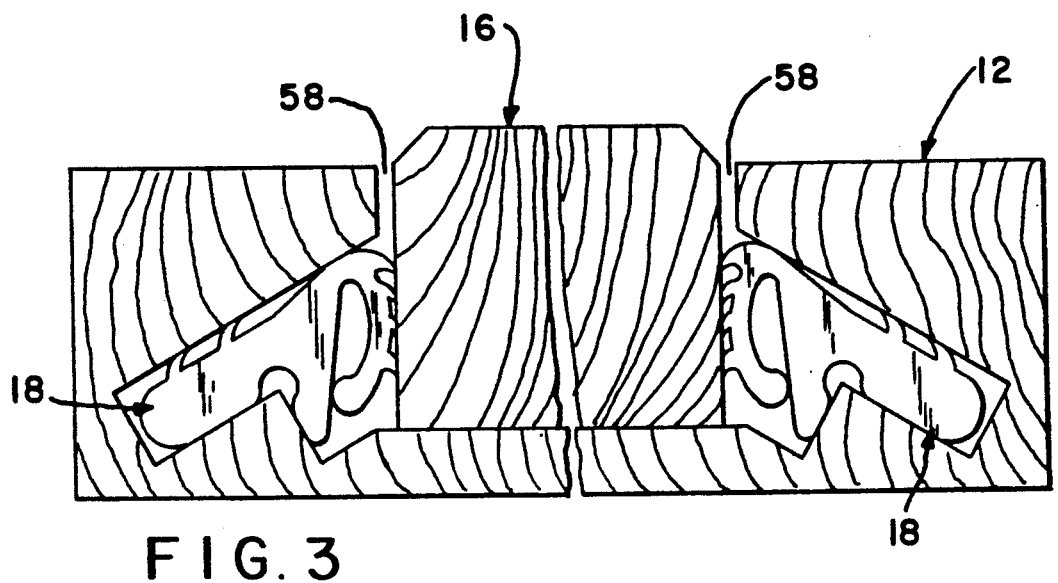
FIG. 3 is a view similar to FIG. 2 following insertion of the trim moulding.

As illustrated in FIG. 1, the insert grooves 20 open into recess 14 at the bottoms of sides 22 adjacent recess bottom wall 24. Each groove 20 extends into the base molding in a direction angled down toward the bottom of the molding at an obtuse angle 26 relative to the adjacent recess side 22. Angle 26 is obtuse to facilitate positioning of rotary milling or cutting tooling within the recess 14 which may have a width relatively narrow with respect to the size of the tooling. Each groove 20 includes a relatively wide slot 30 opening into recess 14 and a narrow, deep slot 28 away from the recess. An insert locating step 32 facing recess 14 is provided at the junction between slots 28 and 30. The step 32 is located on the bottom of groove 20 adjacent recess bottom wall 24 to reduce the depth of the groove in the molding 12. As illustrated in FIGS. 2 and 3, the width of the slot 30 is approximately twice the width that of the narrow slot 28.

The two-width insert grooves 20 may be formed by a milling operation which removes an appreciable volume of the base molding 12. Because of the depth of the narrow slot 28 and the angle at which the slot extends away from the recess 14 it is difficult to remove all of the cuttings from the bottom of the slot 28, particularly during high volume production. Also, it is difficult to inspect the bottom of the narrow slot 28 visually and assure all cuttings have been removed. However, it is relatively easy to assure that the cuttings are removed from the wide slot 30 and assure that there are no cuttings located over the locating step 32. Insert stop surface 42 is located a distance above the insert nose end 56 less than the depth of the narrow slot 28 to assure that the surface engages the step during insertion before the end 56 of the nose engages the bottom of the narrow slot. In this way, the inserts are properly positioned within the grooves 20 with arms 46 extending into the trim recess 14 a proper distance for engagement with the sides of the trim molding 16 as described. Cuttings, sawdust and the like which may be confined within the bottom of the narrow slots 28 do not prevent accurate positioning of the inserts on locating steps 32.

Figure 5:
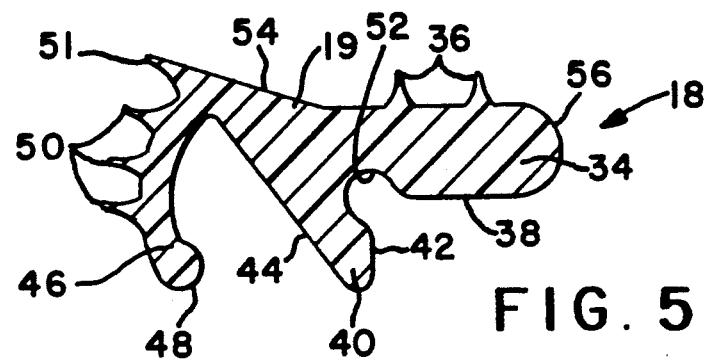
FIG. 5 is a sectional view taken through a retention insert.

FIG. 5 illustrates retention insert 18 having an integral body 19 which may be formed from a plastic material by an extrusion or molding process. Insert 18 has a uniform transverse cross section as shown in FIG. 5. Nose 34 is located at one end of the insert and a contact arm 46 is located at the other end of the insert. A pair of retention spring ribs 36 extend from one side of the nose and a flat locating surface 38 is provided on the other side of the nose. Stop 40 projects from the side of the nose away from the ribs 36 and includes a stop surface 42 facing the end of the nose and an angled support surface 44 facing the contact arm.

Outwardly bowed contact arm 46 on the end of the insert away from nose 34 is joined to the side of the insert adjacent ribs 36. The arm includes a rounded free end 48 normally spaced a distance above surface 44 and a plurality of outwardly projecting spring ribs 50 spaced along the outer surface of the arm.

Relief recess 52 at the intersection of surfaces 38 and 42 permits accurate location of the insert on the step 32 and adjacent side of narrow slot 28. The side 54 of the insert away from nose 34 slopes outwardly to locate the edge rib 51 a distance to one side of the nose.

Figure 4:
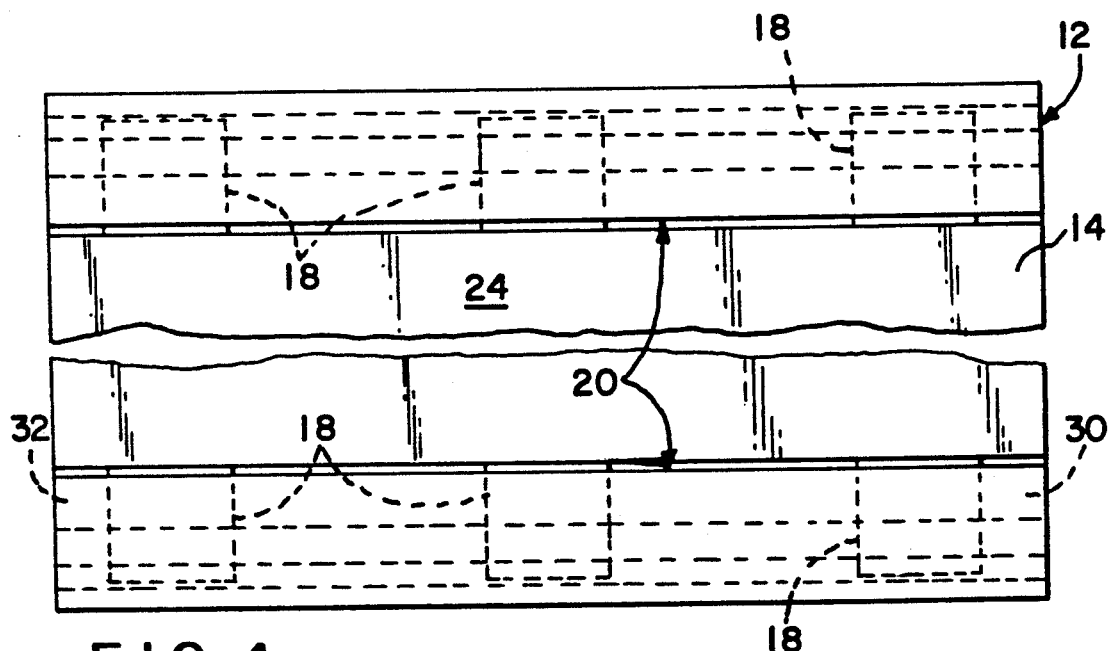
FIG. 4 is a top view of the base molding.

As shown in FIG. 4, inserts 18 have a relatively short width and are positioned in insert grooves 20 at regular intervals along the length of the base molding 12. In practice, the inserts may be positioned continuously or at 6-inch to 12-inch intervals along the base molding as required to provide a reliable connection between the base molding 12 and trim molding 16. FIG. 2 illustrates the position of the inserts 18 in the insert grooves 20. Each insert is piloted into a groove 20 with the rounded nose end 56 freely positioned in the narrow slot 28. The insert is then pushed into the slot to a position as illustrated. The normal spacing between the ends of retention ribs 36 and locating surface 38 as shown in FIG. 5 is greater than the width of the narrow slots 28. Insertion of the insert deforms the ribs 36 as illustrated in FIGS. 2 and 3. The deformed ribs act as springs to hold the nose locating surface 38 flush against the lower wall of the narrow slot. The insert is pushed into groove 20 in this manner until the surface 42 on stop 40 engages locating step 32. As illustrated, this occurs prior to bottoming of the lead end 56 of the nose on the bottom of the narrow slot 28. Insertion of the insert also brings the side surface 54 against upper wall of wide slot 30 thereby spring deforming the insert to provide a tight friction fit between the insert and the groove 20 as illustrated. When fully inserted, the insert spring ribs 50 and 51 project inwardly of the recess sides 22 for engagement with the trim molding 16. Relief recess 52 assures that the insert 18 does not engage any cuttings or debris which may remain at the corner between locating step 32 and the adjacent wall of narrow slot 28.

Trim molding 16 has a width slightly less than the width of the recess 16. This difference is sufficient to permit relative expansion and contraction of the base molding and trim molding due to changes in temperature or humidity without interfering with the fit of the trim molding in the base molding.

The trim molding is positioned in the trim recess 14 by first locating the trim molding above the recess as shown in FIG. 2 and then pushing the trim molding into the recess. Movement of the molding into the recess brings the lower corners of the molding into contact with the spring ribs 50 and 51 thereby flexing the ribs downwardly and bowing the insert contact arms 46 into the grooves 20 until ends 48 engage and are supported by stop surfaces 44. During insertion of the trim moldings into the recesses 14 the inserts 18 are held against insertion into grooves 20 by locating steps 32. Final insertion movement of the trim molding flattens and stresses the concave arms against the sides of the trim molding to improve the frictional engagement with the molding and assure that the molding is tightly held in the fully inserted position as shown in FIG. 3.

Inserted trim moldings 16 may be removed from the base molding by inserting a thin tool down into the slots 58 between the sides of the base molding and the trim molding to further flatten and move the contact arms and spring ribs away from the sides of the trim molding and permit withdrawal of the freed trim molding from the recess 14. In this way, the styled trim molding 16 mounted in the base molding may be replaced with a different pattern trim molding, as required.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A retention insert comprising an elongate body formed from a resilient material, the insert including a nose at one end of the body, an arm support surface and a contact arm having a free end at the other end of the body, said arm extending across the width of the body and being bowed outwardly of the body, with the free end normally spaced a distance from the support surface, an insertion stop adjacent the arm projecting to one side of the nose and having a stop surface facing away from the arm and toward the nose end of the body, and a spring on the side of the nose away from the stop.

2. A retention insert as in claim 1 including a plurality of retention ribs on the side of the nose away from the stop and a plurality of spring ribs on the outer surface of the contact arm.

3. A retention insert as in claim 1 including a plurality of spring ribs on the outer surface of the contact arm.

4. A retention insert as in claim 1 wherein said support surface is located on a side of the stop away from the stop surface.

5. A retention insert as in claim 4 including a relief recess at the intersection of the stop surface and the adjacent side of the nose.

6. A molding assembly comprising an elongate base molding having a trim recess extending along the length of the base molding and defining a first sidewall, a first insert groove extending into the sidewall, the groove including a narrow slot away from the recess and a wide slot opening into the recess with a locating step facing the recess at the junction between the narrow and wide slots, a first retention insert as in claim 1 fitted within the insert groove with the nose extending into the narrow slot, the end of the nose spaced a distance from the bottom of the narrow slot, the stop positioned in the wide slot with the stop surface engaging the locating step and the contact arm extending into the recess, a trim molding in the trim recess, the contact arm engaging one side of the trim molding to form a frictional connection holding the trim molding within the recess.

7. A molding assembly as in claim 6 wherein the recess includes a second sidewall opposite said first sidewall, a second insert groove like said first insert groove extending into the second sidewall and a second retention insert like said first retention insert seated in said second groove, said second retention insert engaging a second side of the trim molding.

8. A molding assembly including a base molding having an elongate trim recess extending the length of the molding, a groove extending into the base molding and including a wide slot adjacent the recess and a narrow slot remote from the recess and a locating step facing the trim recess and separating the narrow and wide slots, a retention insert formed from an integral resilient body fitted within the groove and including a nose extending into the narrow slot and having an end located a distance above the bottom of the narrow slot, a stop overlying the locating step having a stop surface engaging said step, and an insert contact member extending outwardly of the groove and into the trim recess, a trim molding fitted in the recess and having a sidewall facing the groove, the insert contact member frictionally engaging the sidewall to retain the trim molding within the recess.

9. A molding assembly as in claim 8 wherein the insert contact member comprises an arm, and the insert includes an arm stop surface, the arm includes a free end normally located a distance above such surface.

10. A molding assembly as in claim 9 including a plurality of retention ribs located on the outer surface of the arm.

11. A molding assembly as in claim 8 wherein the retention insert includes a spring member engagable with the side of the narrow slot away from the locating step to bias the nose against the opposite side of the narrow slot.

12. A molding assembly as in claim 8 wherein the retention insert includes a relief recess located at the junction between the locating step and the adjacent side of the narrow slot.

13. A molding assembly as in claim 8 wherein the locating step is on the side of the groove adjacent the bottom of the trim recess.

14. A molding assembly as in claim 8 wherein the insert groove is located adjacent the bottom of the trim recess and extends into the base molding at an obtuse angle.

15. An integral retention insert formed from resilient material, the insert including a body having opposed ends and a side, deformable first retention means extending outwardly from the side of the body for frictionally engaging a side of a groove retaining the insert, a support surface on one end of the body extending across the body at an angle, an outwardly bowed arcuate contact arm overlying the surface having one end integrally joining the body on one side of the support surface, a free end normally spaced away from the other side of the support surface and second retention means on the outer bowed surface of the arm normally extending in a direction away from the body for frictionally retaining an adjacent member, said contact arm being resiliently compressible toward the body to seat the free end of the arm on the support surface, and a stop surface on the body facing away from the arm for limiting movement of the insert into a groove retaining the insert.

16. An insert as in claim 15 having a uniform cross section in planes intersecting the side and support surfaces.

17. An insert as in claim 15 wherein the first and second retention means each comprise at least one outwardly extending rib.

18. A molding assembly including an elongate base molding, a trim recess formed in and extending along one surface of the base molding having at least a first sidewall, a first insert groove extending into the base molding from the first sidewall, the groove including a locating surface facing the recess, and a first insert as in claim 15 fitted within the groove with said first retention means engaging a side of the groove, said second retention means projecting into the trim recess, and said stop surface engaging the locating surface, and an elongate trim molding fitted within the trim recess, said molding frictionally engaging said second retention means.

19. A molding assembly as in claim 18 wherein the free end of the arm is located adjacent to the bottom of the recess.

20. A molding assembly as in claim 19 wherein the first retaining means engages the side of the groove away from the bottom of the recess.

21. A molding assembly as in claim 18 wherein the trim recess includes a second sidewall opposite said first sidewall and a second insert groove like said first insert groove formed in the base molding and opening through said second sidewall and a second insert like said first insert fitted in said second insert groove, said trim molding being held within the trim recess between said inserts.

22. A molding assembly as in claim 18 including a plurality of inserts as in claim 17 fitted in and spaced along said insert grooves.

23. A molding assembly comprising an elongate base molding having a trim recess extending along the length of the base molding and defining a first sidewall, a first insert groove extending into the sidewall, the groove including a locating surface below the recess, a first retention insert fitted in the groove, the insert including a body having opposed ends, a support surface on an end of the body facing the trim recess and extending across the body, an outwardly bowed contact arm overlying the surface having one end integrally joined with the body on one side of the body and a free end located adjacent the support surface, and a stop surface facing away from the trim recess and engaging the locating surface, the arm extending outwardly of the slot and into the recess, and a trim molding fitted within the trim recess including a wall adjacent the sidewall, said wall contacting and resiliently deforming the contact arm to form a frictional connection holding the trim molding within the trim recess.

24. A molding assembly as in claim 23 wherein the free end of the arm is located adjacent the bottom of the recess.

25. A molding assembly as in claim 24, wherein the insert groove extends into the recess at an obtuse angle relative to the sidewall.

26. A molding assembly as in claim 25 wherein the trim recess defines a second sidewall opposite the first sidewall and including a second insert groove extending into the second sidewall like said first insert groove and a second retention insert like said first retention insert fitted in the second insert groove, said trim molding being held within the trim recess by frictional connections with both said inserts.

27. A molding assembly as in claim 26 wherein the trim recess and insert grooves extend along the length of the base molding and including a plurality of trim inserts like said first and second trim inserts fitted in and spaced at intervals along the insert grooves.

* * * * *